(12) United States Patent
Zhou

(10) Patent No.: US 7,630,544 B1
(45) Date of Patent: Dec. 8, 2009

(54) SYSTEM AND METHOD FOR LOCATING A CHARACTER SET IN A DIGITAL IMAGE

(75) Inventor: Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1059 days.

(21) Appl. No.: 11/099,951

(22) Filed: Apr. 6, 2005

(51) Int. Cl.
*G06K 9/00* (2006.01)
*G06K 9/34* (2006.01)

(52) U.S. Cl. .................................................... 382/164

(58) Field of Classification Search ................ None
See application file for complete search history.

(56) References Cited

U.S. PATENT DOCUMENTS

| | | | |
|---|---|---|---|
| 4,897,803 A | 1/1990 | Calarco et al. | |
| 5,241,609 A * | 8/1993 | Hasebe et al. | 382/163 |
| 5,375,197 A | 12/1994 | Kang | |
| 5,454,070 A * | 9/1995 | Donelly et al. | 345/589 |
| 5,787,195 A | 7/1998 | Tsujimoto et al. | |
| 5,848,185 A * | 12/1998 | Koga et al. | 382/173 |
| 5,852,678 A | 12/1998 | Shiau et al. | |
| 5,946,420 A | 8/1999 | Noh | |
| 5,960,109 A * | 9/1999 | Shiau | 382/164 |
| 6,035,059 A * | 3/2000 | Kurosawa et al. | 382/164 |
| 6,101,274 A | 8/2000 | Pizano et al. | |
| 6,148,102 A | 11/2000 | Stolin | |
| 6,272,238 B1 * | 8/2001 | Kugai | 382/165 |
| 6,701,010 B1 * | 3/2004 | Katsuyama | 382/165 |
| 6,771,813 B1 * | 8/2004 | Katsuyama | 382/165 |
| 6,990,235 B2 * | 1/2006 | Katsuyama | 382/173 |
| 7,468,732 B2 * | 12/2008 | Okada | 345/589 |
| 2002/0159636 A1 | 10/2002 | Lienhart et al. | |
| 2003/0026480 A1 | 2/2003 | Karidi et al. | |

* cited by examiner

*Primary Examiner*—Yuzhen Ge

(57) ABSTRACT

A method of locating a character set in a digital image comprises examining pixels of the digital image to detect pixels having specified color attributes. Regions of the detected pixels are identified and the identified regions are clustered according to color similarity. Each cluster is examined to detect the cluster meeting specified morphological constraints thereby to locate the character set. An apparatus for locating a character set in a digital image is also provided.

37 Claims, 17 Drawing Sheets

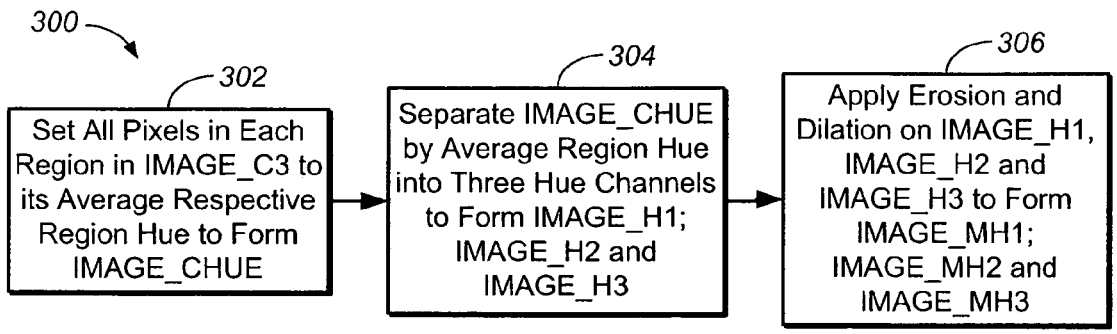
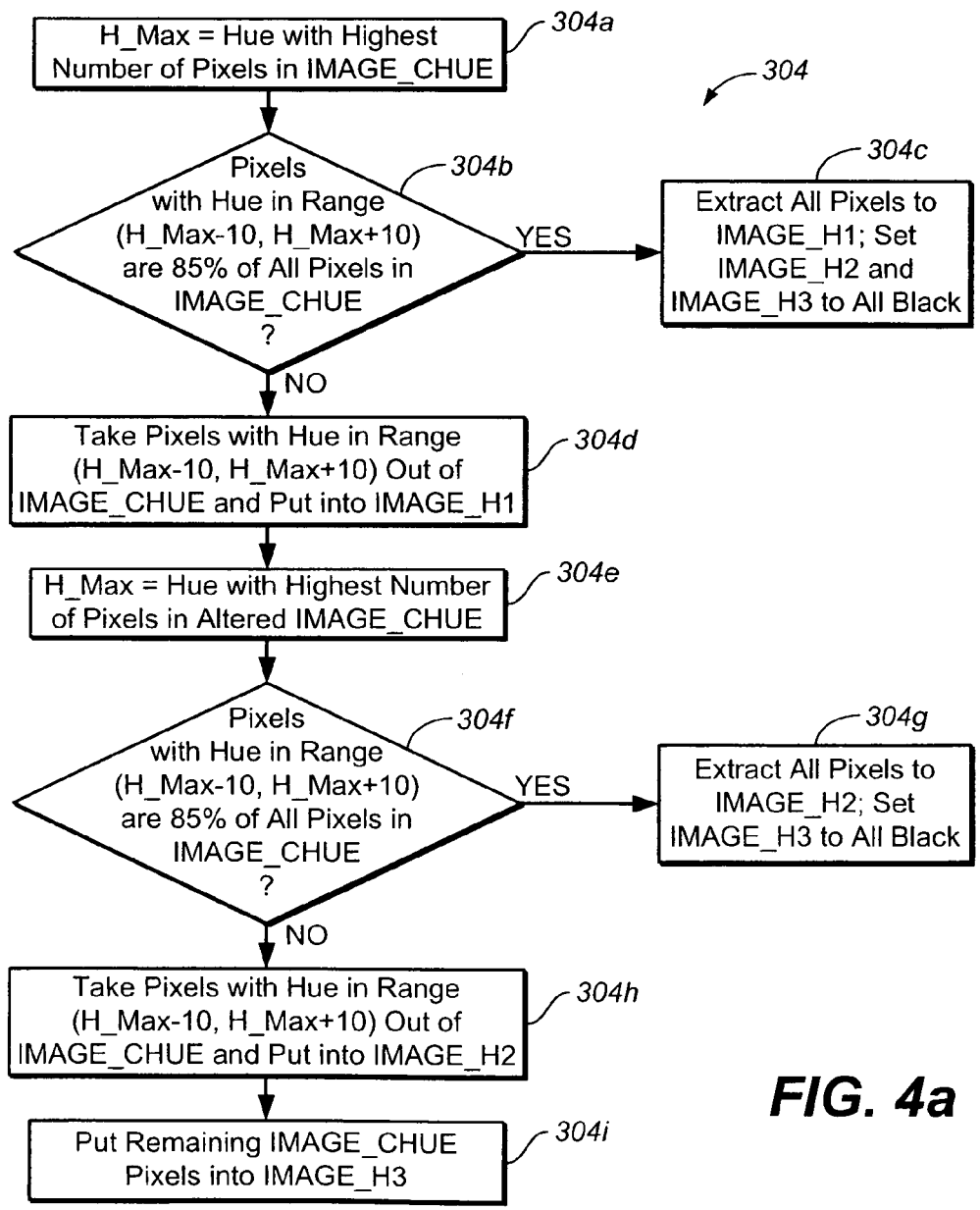
FIG. 4
FIG. 4a

IMAGE_IN

IMAGE_MEDIAN

IMAGE_BLUR

IMAGE_CRGB

IMAGE_CHSL

IMAGE_CCOLOR

IMAGE_DIFFRB

IMAGE_PDIFFRB

IMAGE_RBPDIFFRB

IMAGE_C1

IMAGE_PRGBG

IMAGE_C2

IMAGE_C3

IMAGE_CHUE

IMAGE_H1

IMAGE_H2

IMAGE_H3

IMAGE_MH1

IMAGE_MH2

IMAGE_OUT

IMAGE_IN

IMAGE_OUT

IMAGE_IN

IMAGE_OUT

IMAGE_IN

IMAGE_OUT

IMAGE_IN

IMAGE_OUT

IMAGE_IN

IMAGE_OUT

IMAGE_IN

IMAGE_OUT

SYSTEM AND METHOD FOR LOCATING A CHARACTER SET IN A DIGITAL IMAGE

FIELD OF THE INVENTION

The present invention relates generally to image processing and in particular, to a system and method for locating a character set, such as for example a date stamp, in a digital image.

BACKGROUND OF THE INVENTION

Digital cameras for capturing still images and movies are becoming increasingly popular. Many digital cameras allow very high quality images to be captured. Captured digital images may be processed by the digital camera and/or downloaded to a personal computer (PC) for processing. Capturing images in digital form offers many advantages over its analog counterpart. For example, capturing digital images avoids the step of chemical film processing, which involves the inconvenient procedure of leaving exposed analog film with a specialist. In addition, as most digital cameras capture images in a convenient format such as JPEG, BMP, TIFF or MPEG formats, the digital images may be easily transmitted electronically without conversion, to personal computers and/or peripherals such as printers.

An additional benefit of capturing images in digital form is that a user does not have to be particularly selective when capturing images. Unlike conventional analog film cameras, where exposed analog film is not available for further use, the memory of digital cameras can be used over and over to store images. If sufficient memory is not available, memory can be freed up either by deleting images from the memory or uploading images to a personal computer. This of course allows the user to capture a large number of digital images and later filter the digital images.

When capturing of a large number of images, it is useful for the images to be cataloged in some meaningful way. The software in most digital cameras automatically applies a filename to each captured image allowing the captured images to be identified. The filename may include an indication of the date of image capture, or some other detail concerning the image.

Image collections stored in PC filesystems include not only images captured using a digital camera but often also images from other camera sources. Some of these other images may be scanned copies of analog film prints, which carry perhaps a filename containing the date of scanning rather than the date of image capture, or a title based on an indexing scheme different from that used by the digital camera. In such cases, it is generally up to the user to view each image and manually re-title the filename if it is desired to maintain a searchable image collection. This requirement is particularly important where, for efficiency purposes, a graphic designer or magazine layout artist requires quick and easy access to stock images.

One common attribute applied to both analog film prints and digital images that is useful for indexing is the date stamp. When analog film prints bearing date stamps are scanned to convert them to digital form, the date stamps form part of the scanned images. In many instances, it is desired to detect the date stamps of scanned images so that this information may be used to catalog, identify and/or index the scanned images. Methods are known for extracting date stamps and other text from digital images using edge detection techniques.

For example, U.S. Pat. No. 5,852,678 to Shiau et al. discloses a method of detecting and rendering text in compound document images containing half tone tint regions and text and/or graphics embedded in the half tone tint regions. The method establishes a local average pixel value and effects discrimination based on a range of local averages by calculating gradients or second derivatives using edge information. Each pixel is categorized and is rendered according to its category.

U.S. Pat. No. 5,946,420 to Noh discloses a method of identifying text in a scanned image by first determining whether the image is comprised of mostly white and black pixels, and then sensing alternating left and ride side edges using a vertical/step test function.

U.S. Patent Application Publication No. US2003/0026480 to Karidi et al. discloses a method and apparatus for detecting text in an image that employs intensity troughs and local ramp detection. The image is segmented into text and non-text portions in order to provide higher-quality reproduction by processing the text and non-text portions in different manners. Relatively sharp edges in the image are used as a text criteria.

Although the above references disclose methods for determining the location of characters in digital images, the disclosed methods are generally only suitable in situations where excellent character edge information is available. Often, however, the characteristics of date stamp characters vary significantly depending on whether the image is captured using a digital camera or is a scanned analog film print. For instance, images captured using digital cameras typically have clean edges and are high in saturation. On the other hand, scanned images tend to be noisy and have tainted color due to the translation process. Adding to the difficulties is the fact that date stamps are generally meant to be viewed by the human eye and not by machine. As a result, date stamp character resolution is often low, the color of the date stamp characters is not standardized, the date stamp characters are not necessarily solid colors especially for scanned analog film prints, and the size and font of the date characters can vary significantly. These factors can make character sets and particularly date stamps difficult to locate in images.

It is therefore an object of the present invention to provide a novel system and method for locating a character set, such as for example a date stamp, in a digital image.

SUMMARY OF THE INVENTION

Accordingly, in one aspect there is provided a method of locating a character set in a digital image comprising:

examining pixels of said digital image to detect pixels having specified color attributes;

identifying regions of said detected pixels;

clustering said identified regions according to color similarity; and examining each cluster to detect the cluster meeting specified morphological constraints thereby to locate said character set.

During pixel examining, the pixels are examined to determine if the pixels meet specified red, green and blue (RGB) color properties and specified hue, saturation and luminance (HSL) properties. The specified RGB properties assist in detecting yellowish or reddish pixels.

During identifying, parts of the digital image with little blue information are focused on to identify the pixel regions. Red and blue channel images are extracted from the digital image and processed to yield a multi-level grey scale image. Successive pixels of common grey scale form the regions. The multi-level grey scale image includes four grey scale levels.

The pixel regions are clustered according to hue with the regions being clustered into one of three hue levels to yield first, second and third hue channel images. The hue channel images are examined to detect the cluster of regions meeting the specified morphological constraints.

The morphological constraints require the cluster to have at least three horizontally aligned characters of similar height, require all of the characters in the cluster to be bound by a rectangle between 20 and 80 pixels and require the rectangle to have a width between 20% and 90% of the digital image width.

According to another aspect there is provided an apparatus for locating a character set in a digital image comprising:

a color attribute detector for examining pixels of said digital image to detect pixels having specified color attributes;

a pixel color similarity detector identifying regions of pixels having said specified color attributes and clustering identified regions according to color similarity; and a morphological constraint applyer examining each cluster to detect the cluster meeting specified morphological constraints thereby to locate said character set.

According to yet another aspect there is provided a computer readable medium including a computer program for locating a character set in a digital image, the computer program comprising:

computer program code for examining pixels of the digital image to detect pixels having specified color attributes;

computer program code for identifying regions of the detected pixels;

computer program code for clustering identified regions according to color similarity; and computer program code for examining each cluster to detect the cluster meeting specified morphological constraints thereby to locate set character set.

The method and apparatus for locating a character set provide numerous advantages over the prior art. By using color and morphological constraints, characters can be located efficiently and reliably even when the images include poor edge information. In addition, the method and apparatus can be tuned to detect characters of various shapes and/or colors used by particular manufacturers of digital and analog film cameras. If particular standards are developed for font size, style, color etc. of date stamps, the character set method locating method may advantageously be tuned to such standards.

BRIEF DESCRIPTION OF THE DRAWINGS

Embodiments will now be described more fully with reference to the following drawings, in which:

FIG. 4 is a flowchart showing the steps performed during creation of region clusters having color similarity;

FIG. 4a is a flowchart showing the steps performed during categorization of pixel regions;

DETAILED DESCRIPTION OF THE EMBODIMENTS

In the following description, an embodiment of a method, apparatus and computer program for locating a character set in a digital image is provided. During character set locating, pixels of the digital image are examined to detect pixels having certain colour attributes i.e. character pixel candidates. The character pixel candidates are then grouped into regions and clusters of regions are created according to color similarity. The area bounding the cluster of regions that meets morphological constraints and has the largest number of regions is deemed to be the character set location in the digital image allowing the character set encompassed by the area to be extracted.

The method and apparatus may be embodied in a software application written in Visual Basic, C++, Java or the like including computer executable instructions executed by a processing unit such as a personal computer, server or other computer system environment. The software application may run as a stand-alone digital image editing tool or may be incorporated into other digital imaging applications to provide enhanced functionality to those digital image editing applications. The software application may include program modules including routines, programs, object components, data structures etc. and be embodied as computer readable program code stored on a computer readable medium. The computer readable medium is any data storage device that can store data, which can thereafter be read by a computer system. Examples of computer readable medium include for example, read only memory, random access memory, CD-ROMS, magnetic tape and optical data storage devices. The computer readable program code can also be distributed over a network including coupled computer systems so that the computer readable program code is stored and executed in a distributed fashion. Further specifics concerning character set locating will now be described more fully with reference to FIGS. 1 to 31.

Figure 1:
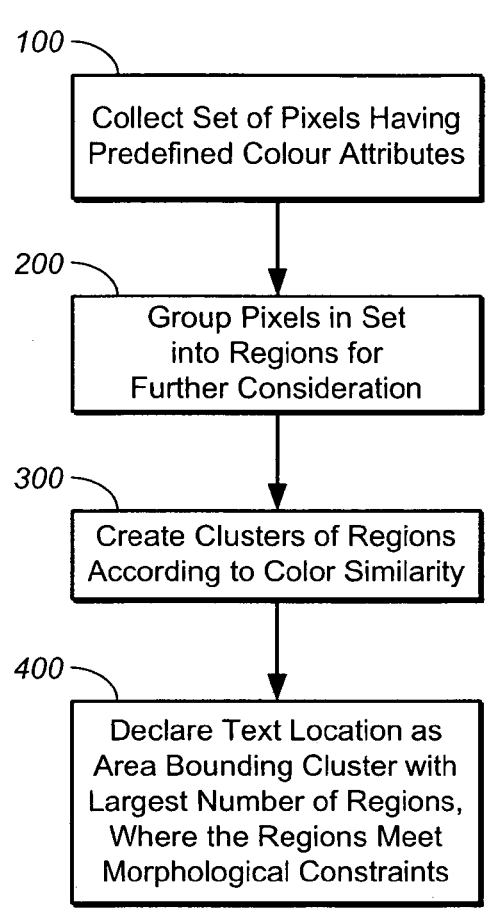
FIG. 1 is a flowchart showing the steps performed to locate a character set, such as for example a date stamp, in a digital image.

Turning now to FIG. 1, the general steps performed to locate a character set in a digital image is shown. In the present embodiment, the character set is a date stamp applied to or superimposed on the digital image. Initially, the pixels of the digital image are examined to detect pixels having color attributes that meet certain constraints making them candidate date stamp character pixels (step 100). Depending on the particular implementation, the color attribute constraints may specify a large or small range of colors, or exact color specifications. The candidate date stamp character pixels are then grouped into regions for further consideration (step 200). After regions of candidate date stamp character pixels have been identified, clusters of regions are created by relating regions according to their color similarity (step 300). This enables regions of similar hue to be identified. Once clusters of regions have been determined, morphological constraints are applied to the regions of each cluster (step 400). The area bounding the cluster whose regions meet the morphological constraints and having the largest number of regions is deemed to be the date stamp location in the digital image. The type and extent of the morphological constraints depend on the type of text being located.

Figure 2:
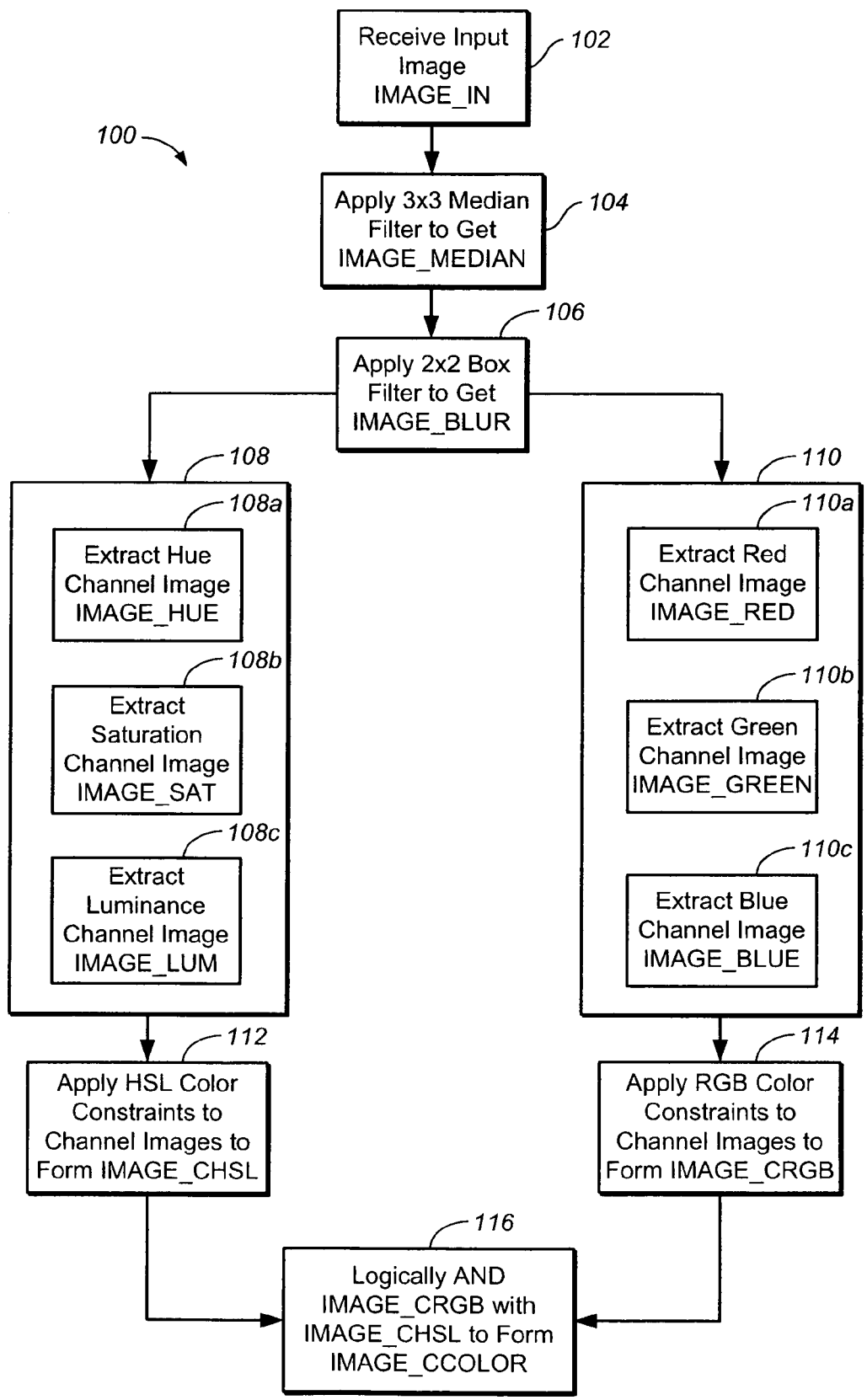
FIG. 2 is a flowchart showing the steps performed during examination of pixels in a digital image to detect candidate date stamp character pixels.

FIG. 2 better illustrates the steps performed during examination of the pixels in the digital image to detect candidate date stamp character pixels (step 100 in FIG. 1). Initially, upon receipt of the input digital image IMAGE_IN (step 102 and FIG. 6), a 3×3 median filter is applied to the input image IMAGE_IN to remove noise thereby to yield a filtered image IMAGE_MEDIAN (step 104 and FIG. 7). The filtered image IMAGE_MEDIAN is then further filtered to remove noise by applying a blur using a 2×2 box filter thereby to yield a blurred image IMAGE_BLUR (step 106 and FIG. 8).

The blurred image IMAGE_BLUR is then processed along parallel channels (steps 108 and 110) to determine if the pixels therein meet certain constraints. In this case, the blurred image is processed to determine if it exhibits certain red, green and blue (RBG) properties and certain hue, saturation and luminance (HSL) properties. It has been observed that in general, date stamps superimposed on digital images by popular digital cameras have a yellowish or reddish color. As a result, date stamp character pixels have been found to have red, green and blue (RGB) properties that are outside all of the following combination of ranges:

red<80;
green>180 and red<100;
blue>180 and red<100;
red>100 and green>100 and blue<80;
red>180 and green>180 and blue>180;
green>(red+50) and red>100;
blue>(red+50) and red>100;
green<(red+15) and red<100;
blue>(red+15) and red<100;
|red-green|<30 and |red-blue|<30 and |green-blue|<30;

where each of red, green, and blue is in the range 0 to 255.

The above RGB color properties are referred to hereinafter as the C_RGB constraints. Should a pixel be found that satisfies the C_RGB constraints, it is considered not to be part of a date stamp character.

It has also been found that date stamps have hue, saturation, luminance (HSL) properties that are outside of the following combination of ranges:

80<hue<280;
saturation<0.28; and
luminance<0.40;

where hue is in the range 0 to 360, saturation is in the range 0 to 1.0, and luminance is in the range 0 to 1.00.

The above HSL properties are referred to hereinafter as the C_HSL constraints. Should a pixel be found that satisfies the C_HSL constraints, it is considered not to be part of a date stamp character.

To determine if the pixels of the blurred image IMAGE_BLUR meet the C_HSL constraints, hue, saturation and luminance channel images are extracted from the blurred image IMAGE_BLUR (steps 108a to 108c). Likewise to determine if the pixels of the blurred image IMAGE_BLUR meet the C_RBG constraints, red, green and blue channel images are extracted from the blurred image IMAGE_BLUR (steps 110a to 110c).

Figure 10:
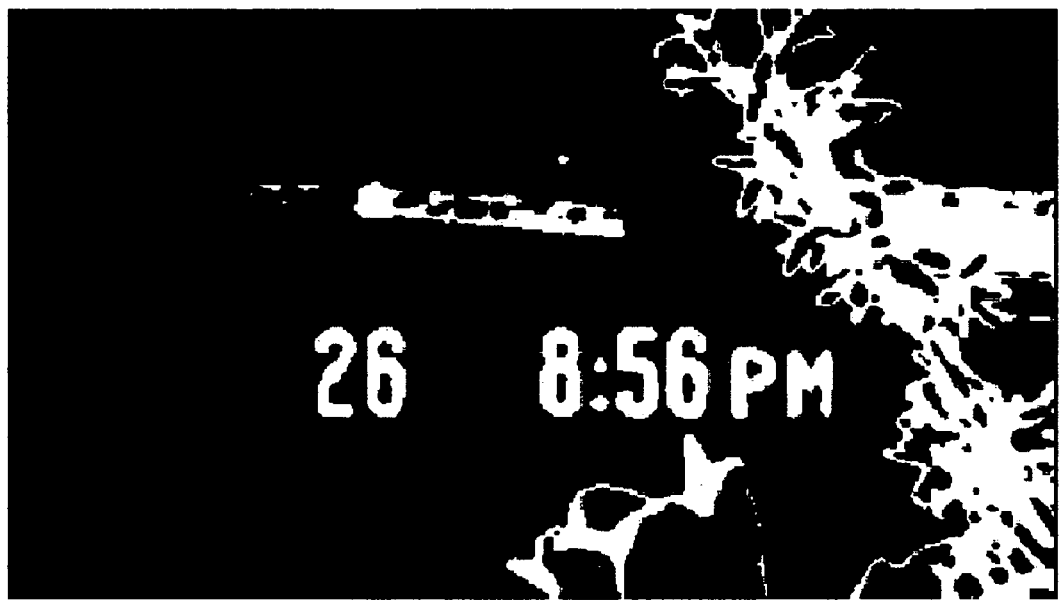

The C_HSL constraints are applied to the hue, saturation and luminance channel images IMAGE_HUE, IMAGE_SAT and IMAGE_LUM respectively and the resultant images are combined to yield a single black and white image IMAGE_CHSL (step 112 and FIG. 10). The white portions of the image IMAGE_CHSL represent pixels that do not meet the C_HSL constraints, and are therefore candidate date stamp character pixels. The black portions of the image represent pixels IMAGE_CHSL that meet the C_HSL constraints and are therefore, not potential date stamp character pixels.

Figure 9:

The C_RGB constraints are applied to the red, green and blue channel images and the resultant images are combined to yield and a single black and white image IMAGE_CRGB (sep 114 and FIG. 9). The white portions of image IMAGE_CRGB represent pixels that do not meet the C_RGB constraints and are therefore, candidate date stamp character pixels. The black portions of image IMAGE_CRGB represent pixels that meet the C_RGB constraints and are therefore, not potential date stamp character pixels.

Figure 11:
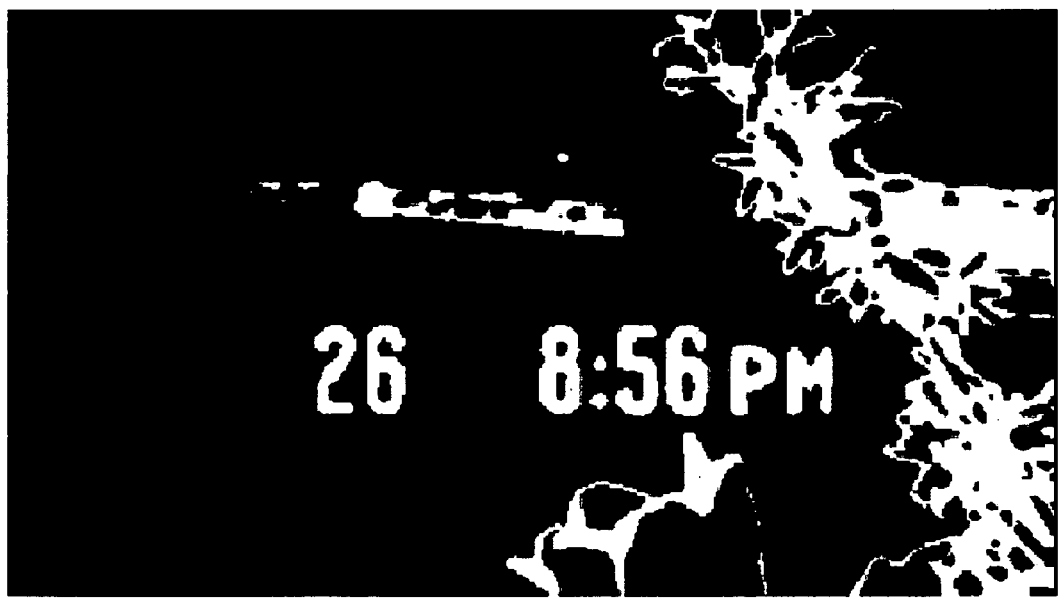

The information in the black and white images IMAGE_CHSL and IMAGE_CRGB are then combined by way of a logical AND operation to form a resultant image IMAGE_CCOLOR (step 116 and FIG. 11). Thus pixels that are white in both images IMAGE_CHSL and IMAGE_CRGB are white in the resultant image IMAGE_CCOLOR, and pixels that are black in either of the images IMAGE_CHSL and IMAGE_CRGB are black in the resultant image IMAGE_CCOLOR. As such, the resultant image IMAGE_CCOLOR, while only black and white, identifies pixels of the blurred image IMAGE_BLUR that represent candidate data stamp characters i.e. white pixels.

Figure 3:
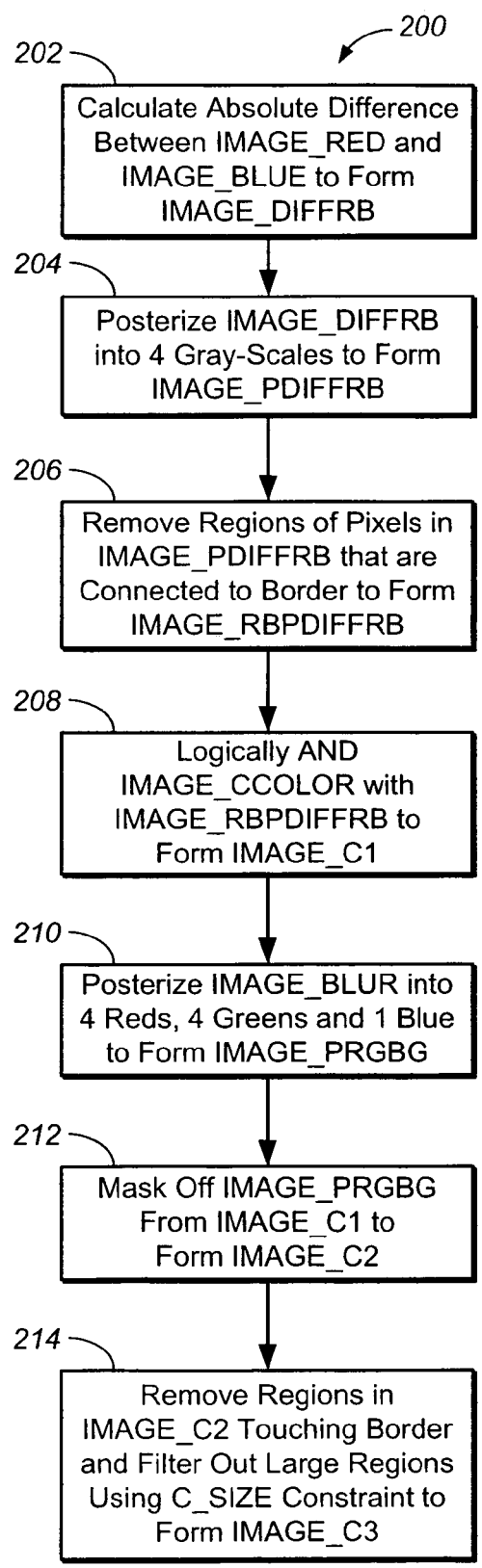
FIG. 3 is a flowchart showing the steps performed during grouping of candidate date stamp character pixels into regions.

FIG. 3 is a flowchart showing the steps performed during grouping of the white pixels of the resultant image IMAGE_CCOLOR into regions for further consideration (step 200 in FIG. 1). As will be appreciated, reddish or yellowish colors have little blue in them. As date stamp characters tend to be reddish or yellowish, focus can be made on parts of the image having little blue information in order to locate date stamp characters.

Figure 12:
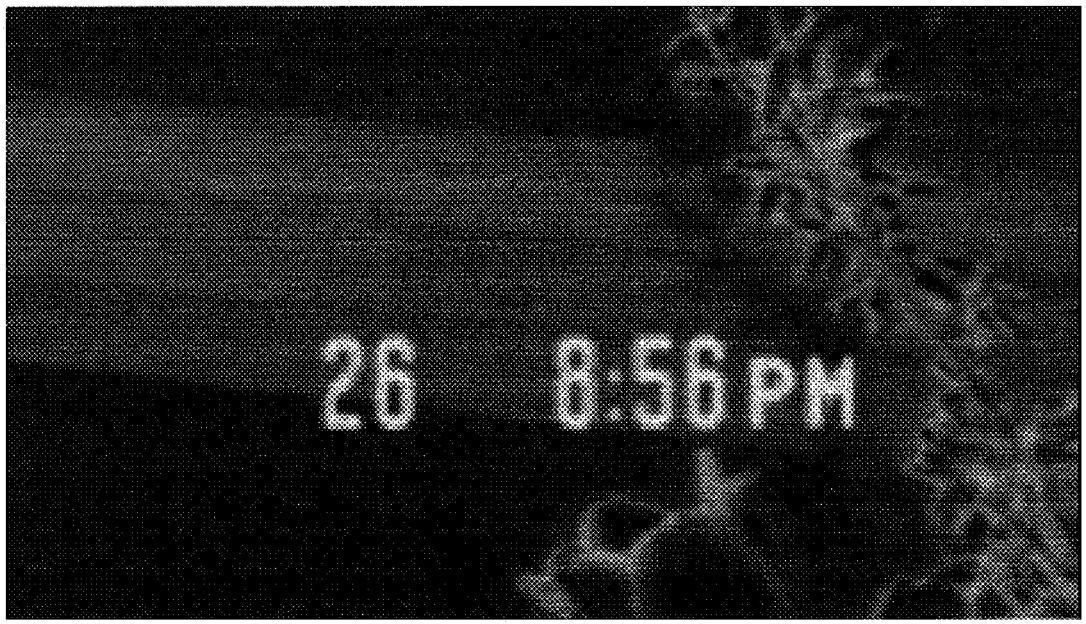
Figure 13:
Figure 14:
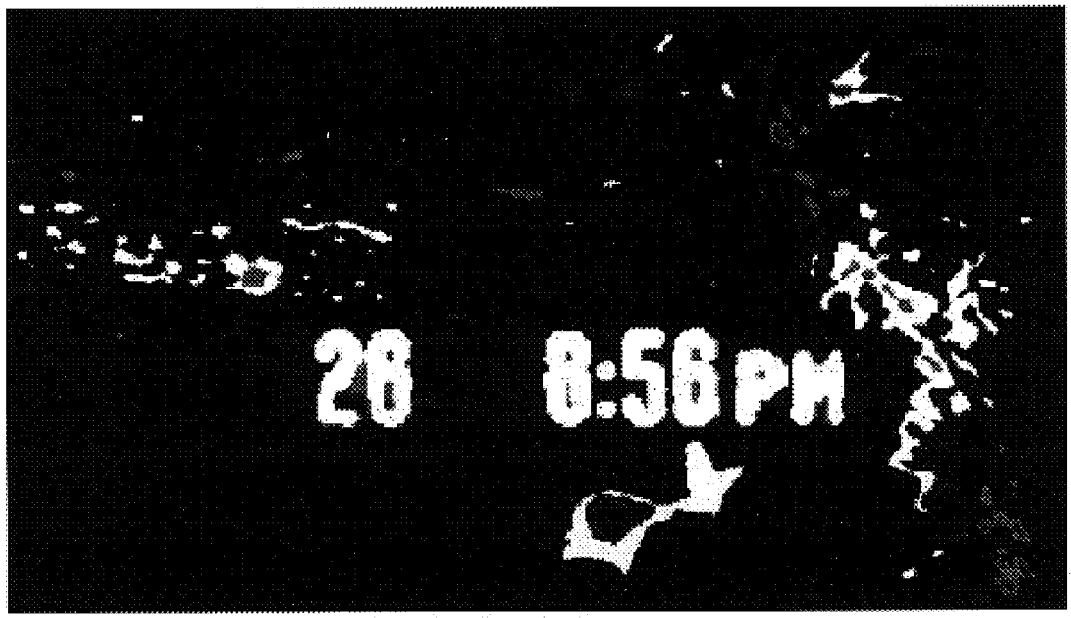
Figure 15:
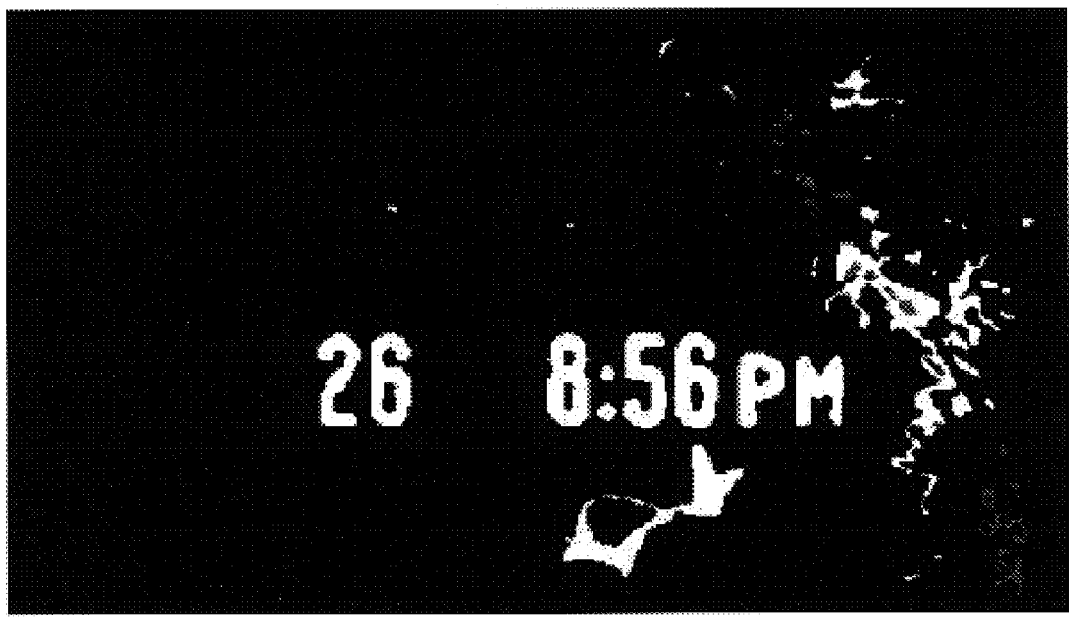

In order to focus on parts of the image with little blue information, the absolute difference between the red and blue channel images is calculated to form a difference image IMAGE_DIFFRB (step 202 and FIG. 12). The difference image IMAGE_DIFFRB is then posterized by quantizing its pixels into a one of four grey-scales to form a posterized difference image IMAGE_PDIFFRB (step 204 and FIG. 13).

It has also been observed that date stamp characters do not generally touch the border of uncropped images. Successive pixels of common grey-scale in the posterized difference image are then collected to form pixel regions, and those regions with pixels at the edge of the image are removed to form image IMAGE_RBPDIFFRB (step 206 and FIG. 14). At this stage, resultant image IMAGE_CCOLOR is combined with image IMAGE_RBPDIFFRB by way of a logical AND to form image IMAGE_C1 (step 208 and FIG. 15).

Figure 16:
Figure 17:
Figure 18:
Figure 19:

To additionally focus on parts of the digital image with little blue information, the blurred image IMAGE_BLUR is also posterized by quantizing its pixels by color channel into one of four (4) red colors, four (4) green colors and one (1) blue color to form image IMAGE_PRGBG (step 210 and FIG. 16). Image IMAGE_PRGBG is then used to mask off image IMAGE_C1 to form image IMAGE_C2 (step 212 and FIG. 17).

To increase efficiency of subsequent processing, pixel regions touching the image edge are removed from image IMAGE_C2. An efficiency C_SIZE constraint is employed to reduce processing time. The C_SIZE constraints requires the number of pixels in each date stamp character to be between 12 and 5500 pixels and the bounding box (square) surrounding each date stamp character to be between 3×3 and 90×90 pixels. The C_SIZE constraints are then applied to image IMAGE_C2 to remove over and under-sized regions to form image IMAGE_C3 (step 214 and FIG. 18). Image IMAGE_C3 includes regions of pixels that are potential date stamp characters.

FIG. 4 is a flowchart showing the steps performed during creation of region clusters by determining pixel regions in image IMAGE_C3 that have color similarity (step 300 in FIG. 1).

Each pixel region in image IMAGE_C3 will very likely include pixels of slightly varying hue. Initially, all of the pixels in each region is set to the average hue of the pixels in that region to form image IMAGE_CHUE (step 302 and FIG. 19). This hue information is obtained from image IMAGE_HUE, calculated in step 108$a$ (FIG. 2). As a result the pixels of each region have a uniform hue.

Regions in the image IMAGE_CHUE are then categorized, or clustered according to hue. Specifically, the pixel regions are clustered into first, second and third channels depending on the average hue of the pixel regions (step 304). The pixel regions clustered into the first channel are separated into hue channel image IMAGE_H1 (FIG. 20), the regions clustered into the second channel are separated into hue channel image IMAGE_H2 (FIG. 21), and the regions clustered into the third channel are separated into hue channel image IMAGE_H3 (FIG. 22).

FIG. 4$a$ is a flowchart of the steps performed during categorization of the pixel regions of image IMAGE_CHUE into the channels and separating the pixel regions to form hue channel images IMAGE_H1, IMAGE_H2 and IMAGE_H3, respectively (shown in general as step 304 in FIG. 4). H_Max representing the hue in image IMAGE_CHUE with the highest number of pixels is determined (step 304$a$). If 85% of the pixels in image IMAGE_CHUE have a hue that falls in the range (H_Max−10, H_Max+10) (step 304$b$), then all of the pixels in image IMAGE_CHUE are used to form hue channel image IMAGE_H1 (step 304$c$). Hue channel images IMAGE_H2 and IMAGE_H3 are then set to all black.

If less than 85% of the pixels in image IMAGE_CHUE have a hue that falls in the range (H_Max−10, H_Max+10), then the pixels from image IMAGE_CHUE that fall in the range (H_Max−10, H_Max+10) are taken out of image IMAGE_CHUE and put into hue channel image IMAGE_H1 (step 304$d$). A new H_Max representing the hue in altered image IMAGE_CHUE with the highest number of pixels is then determined (step 304$e$). If 85% of the pixels in altered image IMAGE_CHUE have a hue that falls in the range (H_Max−10, H_Max+10) (step 304$f$), then all of the pixels in altered image IMAGE_CHUE are used to form hue channel image IMAGE_H2 (step 304$g$). Hue channel image IMAGE_H3 is then set to all black.

If less than 85% of the pixels in altered image IMAGE_CHUE have a hue that falls in the range (H_Max−10, H_Max+10), then the pixels from altered image IMAGE_CHUE that fall in the range (H_Max−10, H_Max+10) are taken out of altered image IMAGE_CHUE and put into hue channel image IMAGE_H2 (step 304$h$). The remaining pixels are then put into hue channel image IMAGE_H3 (step 304$i$).

Figure 26:
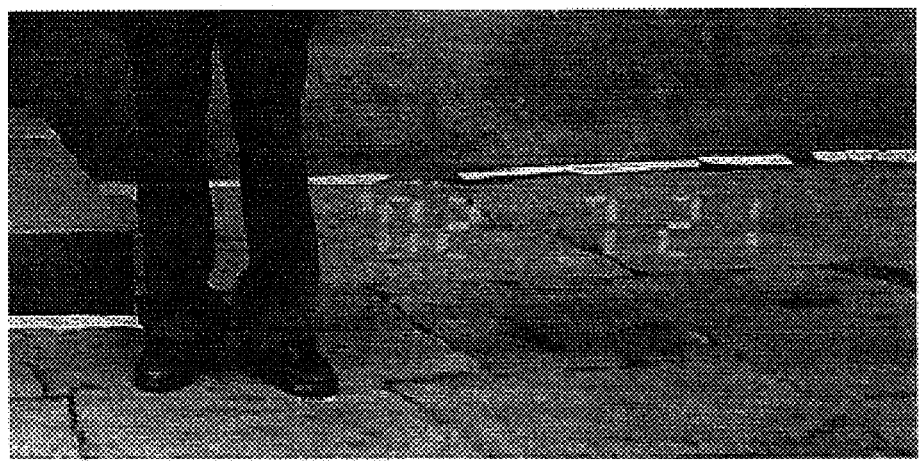
FIGS. 26 to 31 show other exemplary digital images and date stamps extracted therefrom using the character set locating method of FIGS. 1 to 5.
Figure 26:
Figure 27:
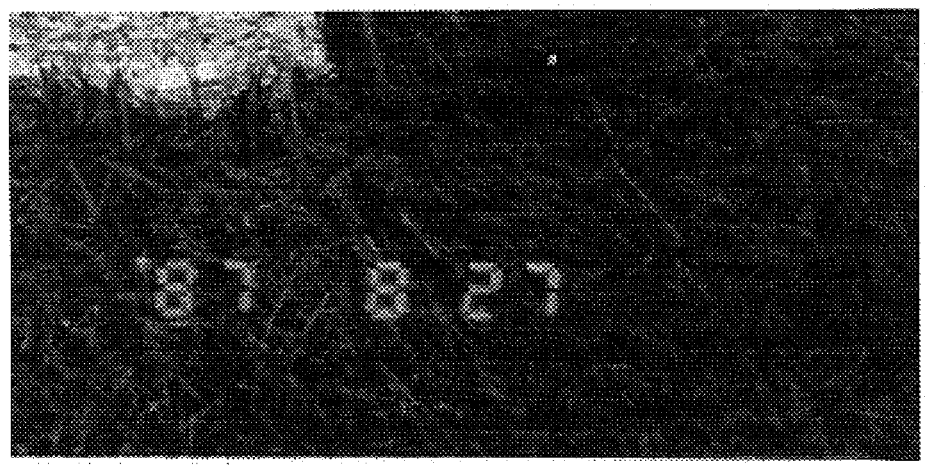
Figure 27:
Figure 28:
Figure 28:

Some characters in date stamps comprise several slightly disconnected portions, depending on the font and/or style of the date stamp characters. Some examples of these types of characters are shown in FIGS. 26 to 28. According to some fonts, a numeral "2", for instance, may consist of three (3) horizontal and two (2) vertical unconnected bars. Furthermore, almost every font represents characters such as ":" as two disconnected portions. In view of these properties of date stamp characters, a series of dilation and erosion operations are conducted on each of the hue channel images IMAGE_H1, IMAGE_H2 and IMAGE_H3 to account for these properties.

In this embodiment, an 8-neighbor dilation and erosion (represented by D8 and E8, respectively) in 3×3 pixel local windows is combined with 2-neighbor dilation and erosion (represented by D2 and E2, respectively) up and down in 3×3 pixel local windows as follows (step 306):

D8, E8, D8, D8, E8, E8, D8, D8, E8, E8, E8, D8, D8, D8, D2, D2, D2, D2, E2, E2, E2, E2.

Figure 20:
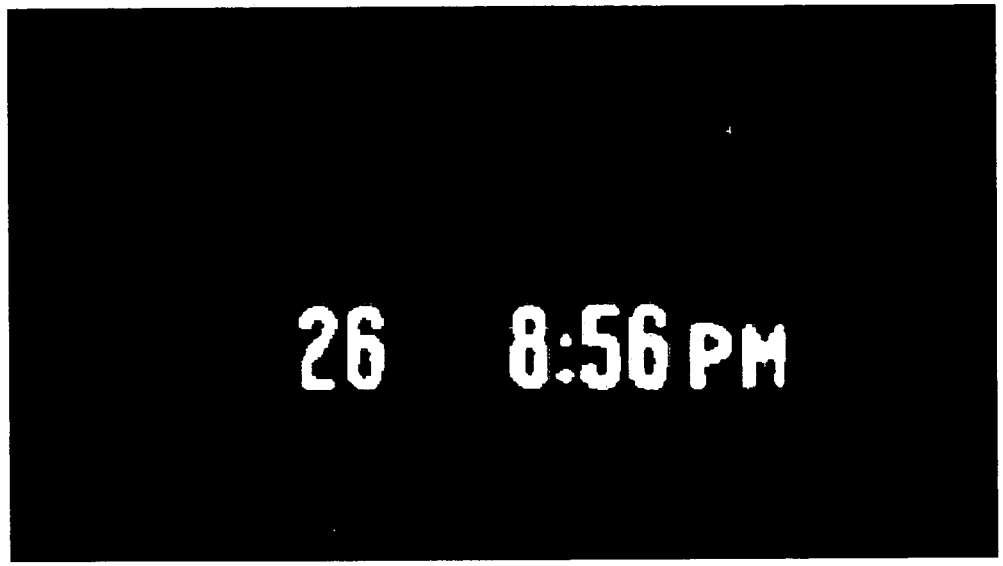
Figure 21:
Figure 22:
Figure 23:
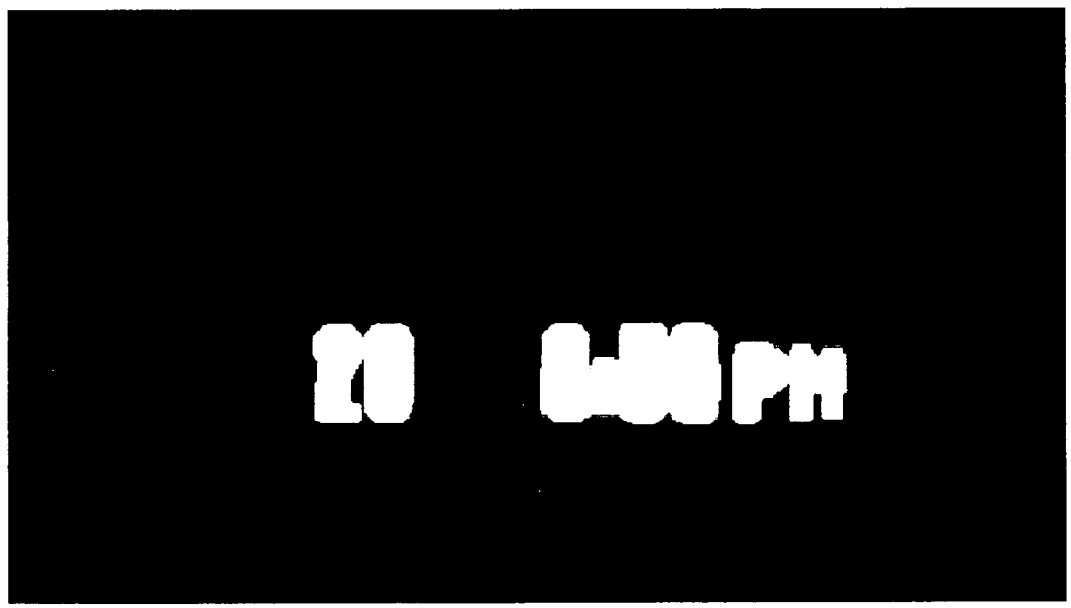
Figures 24, 25:
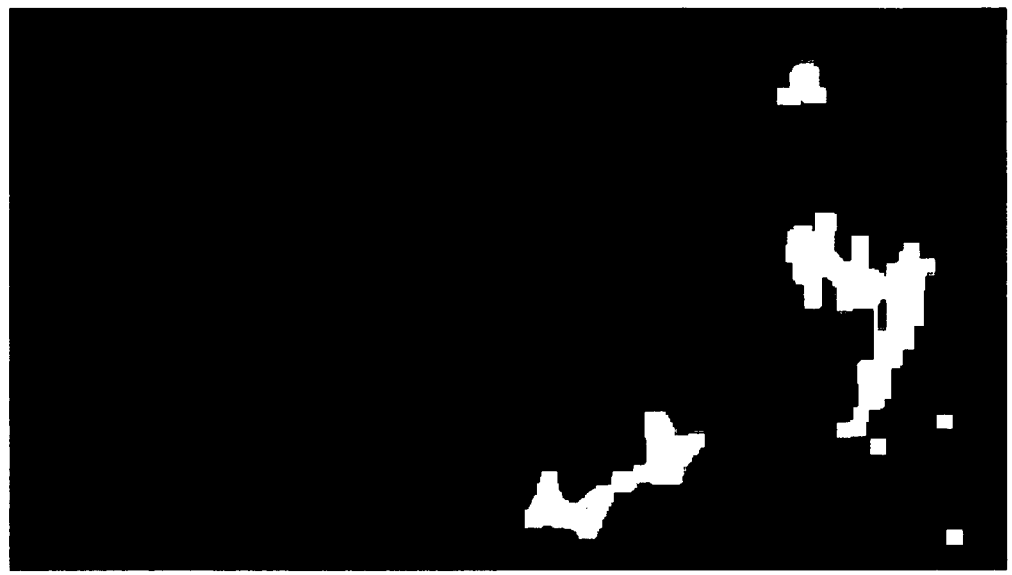

The effect of the erosion and dilation operations is seen by comparing FIGS. 20 and 21 (hue channel images IMAGE_H1 and IMAGE_H2 respectively) to respective ones of FIGS. 23 and 24 (images IMAGE_MH1 and IMAGE_MH2 respectively). Image IMAGE_MH3 is not shown because in this example it is entirely black (i.e. without pixel regions).

As can be seen, for example, in FIG. 23 (image IMAGE_MH1), regions representing candidate date stamp characters have been combined in a manner that is advantageous to the application of morphological constraints, as will be described below. Of particular note is the apparent combination of the two parts of the ":" into a single region and the combination of that single region with adjacent character regions.

Figure 5:
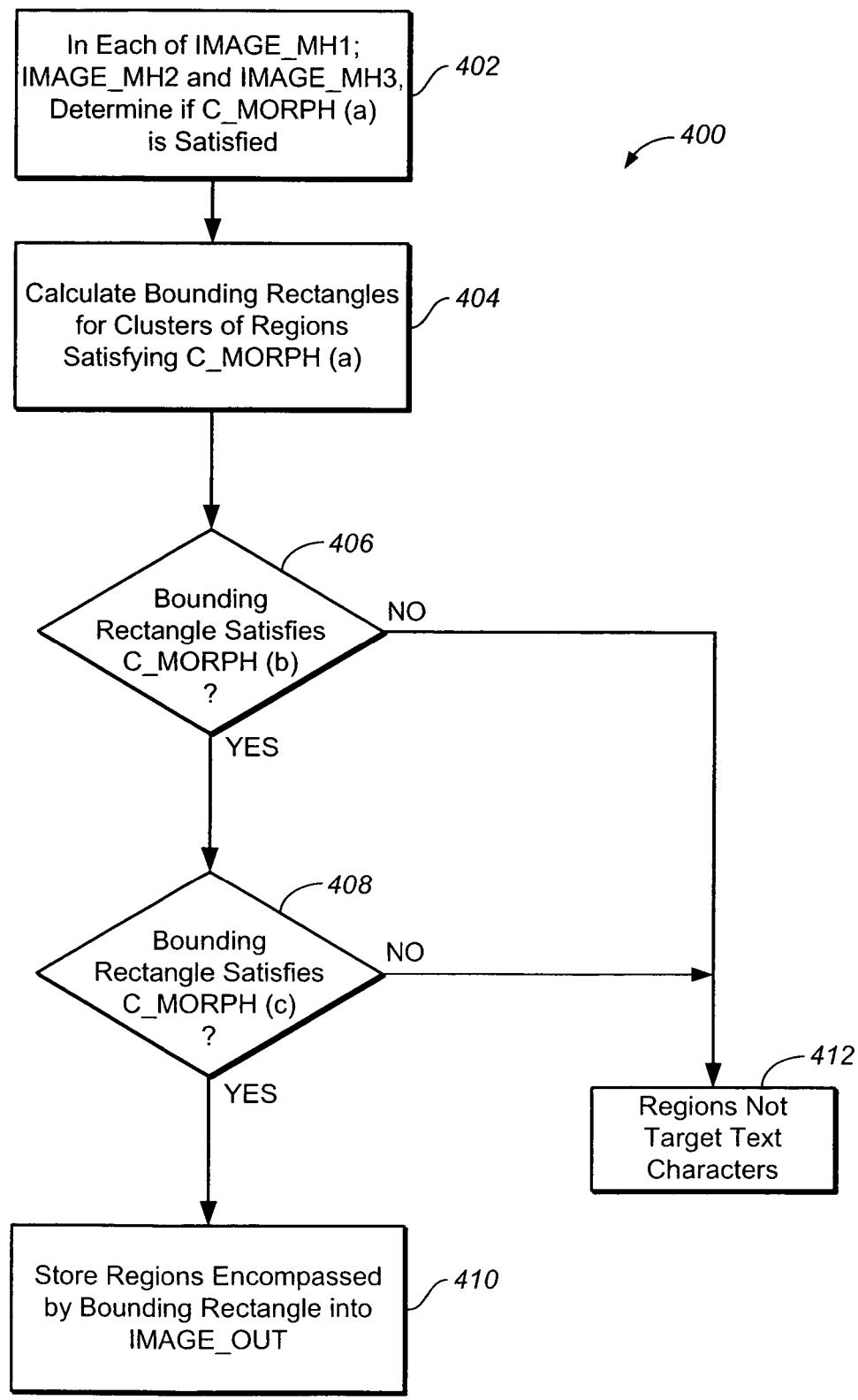
FIG. 5 is a flowchart showing the steps performed during application of morphological constraints to the region clusters.
Figure 6:
FIG. 6 is an exemplary digital image including a date stamp.
Figure 7:
FIGS. 7 to 25 show transformation of the digital image of FIG. 6 at various stages during application of the character set locating method of FIGS. 1 to 5.
Figure 8:

FIG. 5 shows the particular steps performed during application of morphological constraints on each of the region clusters (step 400). Images IMAGE_MH1, IMAGE_MH2 and IMAGE_MH3 that have region clusters i.e. those images that are not black, are tested to determine if the clusters of regions therein meet morphological constraints. Based on observations of morphological properties of date stamp characters, the following morphological C_MORPH constraints are predefined and require that:

a) the cluster include at least three (3) date stamp characters horizontally aligned with one another and of similar height;

b) the height of a bounding rectangle of all of the date stamp characters is between 20 and 80 pixels;

c) the width of the bounding rectangle is between 20 and 90 percent of the digital image width.

In particular, the images IMAGE_MH1, IMAGE_MH2 and IMAGE_MH3 are tested to determine whether the clusters of regions pass part (a) of the C_MORPH constraints (step 402). For those images with clusters of regions that pass part (a) of the C_MORPH constraints, bounding rectangles are calculated (step 404). The bounding rectangles are the smallest possible rectangles that encompass all of the regions in a cluster.

The calculated bounding rectangles are then examined to determine if the bounding rectangles meet parts (b) and (c) of the C_MORPH constraints. If only a single bounding rectangle meets parts (b) and (c) of the C_MORPH constraints (steps 406 and 408), then the location of the date stamp is declared as the area encompassed by that bounding rectangle. Should more than one bounding rectangle meet parts (b) and (c) of the C_MORPH constraints, then the area encompassed by the bounding rectangle associated with the cluster having the most regions is declared as the location of the date stamp. This location is then stored allowing the date stamp to be extracted and a date stamp output image IMAGE_OUT generated (step 410 and FIG. 25).

Should no bounding rectangle not satisfy parts (b) and (c) of the C_MORPH constraints, the digital image is considered not to encompass date stamp characters (step 412).

Parts (b) and (c) of the C_MORPH constraints may be summarized according to the following equation:

SCORE=S1+S2+S3;

where:
S1=−10 if bounding rectangle is outside of part (b);
S1=+10 if bounding rectangle is within part (b);
S2=−10 if bounding rectangle is outside of part (c);
S2=+10 is bounding rectangle is within part (c); and
S3=number of regions encompassed by bounding rectangle.

FIGS. 26 to 31 show input digital images and extracted date stamp output images. The tests were performed using Microsoft Windows™ 2000 Professional, Service Pack 4 running on a 1.7 Ghz Pentium4™ CPU with 768 MB of RAM.

FIG. 26 shows an input digital image IMAGE_IN of pixel frame size 676×377 and an extracted date stamp output image IMAGE_OUT. The time to calculate the output image IMAGE_OUT using the above-described method was 672 milliseconds.

FIG. 27 shows an input digital image IMAGE_IN of pixel frame size 676×363 and an extracted date stamp output image IMAGE_OUT. The time to calculate IMAGE_OUT using the above-described method was 688 milliseconds.

FIG. 28 shows an input digital image IMAGE_IN of pixel frame size 676×363 and an extracted date stamp output image IMAGE_OUT. The time to calculate IMAGE_OUT using the above-described method was 860 milliseconds.

Figure 29:
Figure 29:

FIG. 29 shows an input image IMAGE_IN of pixel frame size 420×239 and an extracted date stamp output image IMAGE_OUT. The time to calculate IMAGE_OUT using the above-described method was 281 milliseconds.

Figure 30:
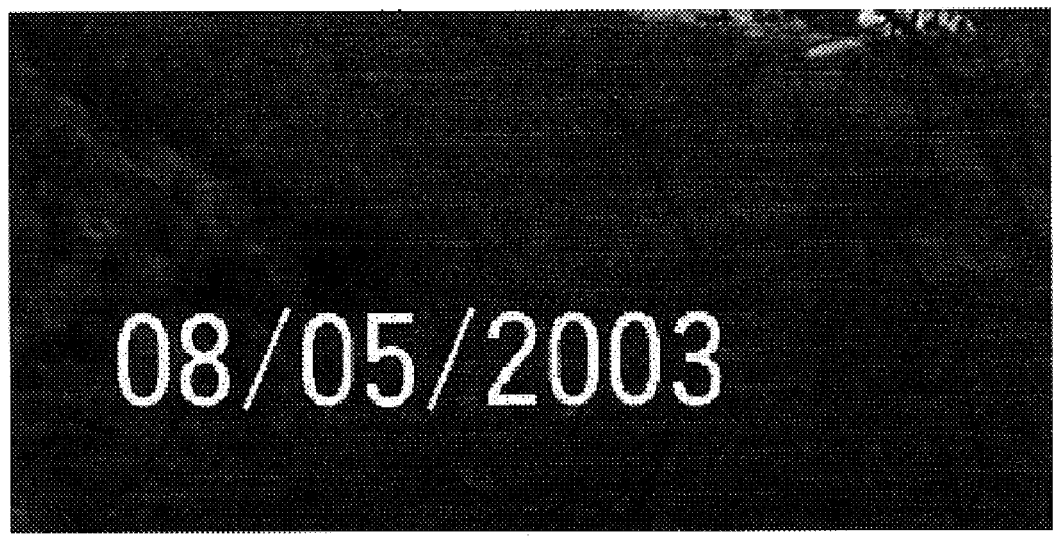
Figure 30:

FIG. 30 shows an input image IMAGE_IN of pixel frame size 640×480 and an extracted date stamp output image IMAGE_OUT. The time to calculate IMAGE_OUT using the above-described method was 609 milliseconds.

Figure 31:
Figure 31:

FIG. 31 shows an input image IMAGE_IN of pixel frame size 384×200 and an extracted date stamp output image IMAGE_OUT. The time to calculate IMAGE_OUT using the above-described method was 313 milliseconds.

As will be appreciated by those of skill in the art, the RGB, HSL and morphological constraints discussed above are exemplary. These constraints may be adjusted or altered ("tuned") to allow the location of particular characters to be located. Also, although the above-described method discloses use of C_HSL and C_RGB constraints, other constraints with different ranges may be used depending on the nature of the characters being targeted. In fact, other types of text, such as captions can be located using the principles disclosed herein. Different ranges of morphological C_MORPH constraints may be devised and additional morphological constraints may be employed for narrowing character locating to a particular type or font of character.

The method may also be used to locate text of interest integrated into pictures. For example, a user may wish to search for pictures in which a "NYPD" police car with blue lettering is pictured. Some tuning by a user may be necessary to narrow down the color range, and additional or fewer morphological constraints may be useful also.

Furthermore, the clustering of regions into hue channels may be done in various ways. For example, while 85% of pixels in the image having a particular hue has been determined to be advantageous through testing, other thresholds may be used. Also, extraction and removal of pixels in the (H_Max−10; H_Max+10) range would be understood to be somewhat flexible also, such that the choosing of the range would might alter based on the implementation details. Additionally, other methods such as setting absolute hue ranges or hue ranges that relate to the chosen color constraints in C_HSL may be employed.

Although embodiments have been described, those of skill in the art will appreciate that the variations and modifications may be made without departing from the spirit and scope of the invention defined by the appended claims.

What is claimed is:

1. A method of locating a character set in a digital image comprising:
  using a processing unit to perform the following steps:
    examining pixels of said digital image to detect pixels having specified color attributes;
    identifying regions of said detected pixels;
    clustering said identified regions according to color similarity; and
    examining each cluster to detect the cluster meeting specified morphological constraints thereby to locate said character set;
    wherein during pixel examining, the pixels are examined to determine if the pixels meet at least one of specified red, green, blue (RGB) color properties and specified hue, saturation and luminance (HSL) properties; and
    wherein detected pixels having said specific color attributes are those having red, green and blue channel values outside of the following constraints:
  red<80;
  green>180 and red<100;
  blue>180 and red<100;
  red>100 and green>100 and blue<80;
  red>180 and green>180 and blue>180;
  green>(red+50) and red>100;
  blue>(red+50) and red>100;
  green<(red+15) and red<100;
  blue>(red+15) and red<100;
  |red-green|<30 and |red-blue|<30 and |green-blue|<30;
  where each of red, green, and blue is from 0 to 255.

2. The method of claim 1, wherein detected pixels having said specific color attributes are those pixels having red, green and blue channel values outside of the following constraints:
  red<80;
  green>180 and red<100;
  blue>180 and red<100;
  red>100 and green>100 and blue<80;
  red>180 and green>180 and blue>180;
  green>(red+50) and red>100;
  blue>(red+50) and red>100;
  green<(red+15) and red<100;
  blue>(red+15) and red<100;
  |red-gree|<30 and |red-blue|<30 and |green-blue|<30;
  where each of red, green, and blue is from 0 to 255; and having hue, saturation and luminance channel values outside of the following constraints:
  80<hue<280;
  saturation<0.28;
  luminance<0.40;
  where hue is from 0 to 360, saturation is from 0 to 1.0, and luminance is from 0 to 1.00.

3. A method of locating a character set in a digital image comprising:
  using a processing unit to perform the following steps:
    examining pixels of said digital image to detect pixels having specified color attributes;
    identifying regions of said detected pixels;
    clustering said identified regions according to color similarity; and examining each cluster to detect the cluster meeting specified morphological constraints thereby to locate said character set;

wherein during pixel examining, the pixels are examined to determine if the pixels meet at least one of specified red, green, blue (RGB) color properties and specified hue, saturation and luminance (HSL) properties; and wherein detected pixels having said specific color attributes are those pixels having hue, saturation and luminance channel values outside of the following constraints:

80<hue<280;
saturation<0.28;
luminance<0.40;
where hue is from 0 to 360, saturation is from 0 to 1.0, and luminance is from 0 to 1.00.

4. A method of locating a character set in a digital image comprising:

using a processing unit to perform the following steps:
examining pixels of said digital image to detect pixels having specified color attributes;
identifying regions of said detected pixels;
clustering said identified regions according to color similarity; and
examining each cluster to detect the cluster meeting specified morphological constraints thereby to locate said character set;
wherein during pixel examining, the pixels are examined to determine if the pixels meet at least one of specified red, green, blue (RGB) color properties and specified hue, saturation and luminance (HSL) properties;
wherein the pixels are examined to determine if the pixels meet both the specified RGB and HSL properties; and
wherein the pixels of said digital image are processed in parallel to determine pixels meeting both the specified RBG and HSL properties.

5. The method of claim 4 further comprising filtering and blurring said digital image prior to said examining thereby to remove noise in said digital image.

6. The method of claim 5, wherein detected pixels having said specific color attributes are those pixels having red, green and blue channel values outside of the following constraints:

red<80;
green>180 and red<100;
blue>180 and red<100;
red>100 and green>100 and blue<80;
red>180 and green>180 and blue>180;
green>(red+50) and red>100;
blue>(red+50) and red>100;
green<(red+15) and red<100;
blue>(red+15) and red<100;
|red-green|<30 and |red-blue|<30 and |green-blue|<30;
where each of red, green, and blue is from 0 to 255; and
having hue, saturation and luminance channel values outside of the following constraints:
80<hue<280;
saturation<0.28;
luminance<0.40;
where hue is from 0 to 360, saturation is from 0 to 1.0, and luminance is from 0 to 1.00.

7. The method of claim 5 wherein said specified RGB properties assist in detecting yellowish or reddish pixels.

8. The method of claim 4 wherein at least one of the RGB and HSL properties and the morphological constraints are tunable.

9. The method of claim 4 wherein each of the RGB and HSL properties and the morphological constraints is tunable.

10. A method of locating a character set in a digital image comprising:

using a processing unit to perform the following steps;
examining pixels of said digital image to detect pixels having specified color attributes;
identifying regions of said detected pixels;
clustering said identified regions according to color similarity; and
examining each cluster to detect the cluster meeting specified morphological constraints thereby to locate said character set; and
wherein during said identifying, parts of the digital image with little blue information are focused on to identify said pixel regions; and
wherein during said identifying, red and blue channel images are extracted from said digital image and processed to yield a multi-level grey scale image, successive pixels of common grey scale forming said regions.

11. The method of claim 10 wherein regions including pixels at edges of said grey scale image are removed.

12. The method of claim 11 wherein said multi-level grey scale image includes four grey scale levels.

13. The method of claim 12 wherein during said processing a difference image of said red and blue channel images is formed, said difference image being posterized to yield said four level grey scale images.

14. The method of claim 10 further comprising examining the sizes of said regions to detect regions within a specified size range thereby to detect potential characters.

15. A method of locating a character set in a digital image comprising:

using a processing unit to perform the following steps:
examining pixels of said digital image to detect pixels having specified color attributes;
identifying regions of said detected pixels;
clustering said identified regions according to color similarity; and
examining each cluster to detect the cluster meeting specified morphological constraints thereby to locate said character set;
wherein said pixel regions are clustered according to hue;
wherein during said clustering the average hue of the pixels in each region is detected and wherein said regions are clustered according to average hue;
wherein said regions are clustered into one of three hue levels to yield first, second and third hue channel images, said hue channel images being examined to detect the cluster of regions meeting said specified morphological constraints; and
wherein during said clustering the hue of the pixels is examined to determine if a threshold number of pixels has a hue level falling within a specified range, if so, all of the pixels being used to form said first hue channel image, said second and third hue channel images being set to black.

16. The method of claim 15 wherein said threshold number is 85% of the pixels.

17. The method of claim 15 wherein if the threshold number of pixels is not reached, the pixels having a hue falling within said specified range being used to form said first hue channel image, the remaining pixels being examined to determine if a second threshold number of pixels has a hue level falling within a second specified range, if so, all of the remaining pixels being used to form said second hue channel image and said third hue channel image being set to black.

18. The method of claim 17 wherein said second threshold number is 85%.

19. The method of claim 17 wherein if the second threshold number of pixels is not reached, the pixels having a hue falling within said second specified range being used to form said second hue channel image, the remaining pixels being used to form said third hue channel image.

20. The method of claim 19, further comprising:
performing erosion and dilation operations on said hue channel images.

21. The method of claim 20 wherein said morphological constraints require the cluster to have at least three horizontally aligned characters of similar height.

22. The method of claim 21 wherein said morphological constraints further require all of the characters in said cluster to be bound by a rectangle between 20 and 80 pixels.

23. The method of claim 22 wherein said morphological constraints further require the rectangle to have a width between 20 and 90% of the digital image width.

24. The method of claim 23, wherein when more than one cluster meets said morphological constraints, the bounding rectangle encompassing the cluster having the greatest number of regions is deemed to be the cluster representing said character set.

25. A method of locating a character set in a digital image comprising:
using a processing unit to perform the following steps:
examining pixels of said digital image to detect pixels having specified color attributes;
identifying regions of said detected pixels;
clustering said identified regions according to color similarity; and
examining each cluster to detect the cluster meeting specified morphological constraints thereby to locate said character set;
wherein said morphological constraints require the cluster to have at least three horizontally aligned characters of similar height;
wherein said morphological constraints further require all of the characters in said cluster to be bound by a rectangle between 20 and 80 pixels; and
wherein said morphological constraints further require the rectangle to have a width between 20% and 90% of the digital image width.

26. The method of claim 25 wherein when more than one cluster meets said morphological constraints, the bounding rectangle encompassing the cluster having the greatest number of regions is deemed to be the cluster representing said character set.

27. An apparatus for locating a character set in a digital image comprising:
a color attribute detector for examining pixels of said digital image to detect pixels having specified color attributes;
a pixel color similarity detector identifying regions of pixels having said specified color attributes and clustering identified regions according to color similarity; and
a morphological constraint applier examining each cluster to detect the cluster meeting specified morphological constraints thereby to locate said character set;
wherein said color attribute detector examines the pixels to determine if the pixels meet at least one of specified red, green, blue (RGB) color properties and specified hue, saturation and luminance (HSL) properties;
wherein the color attribute detector examines the pixels to determine if the pixels meet both the specified RGB and HSL properties; and
wherein detected pixels having said specific color attributes are those pixels having red, green and blue channel values outside of the following constraints:
red<80;
green>180 and red<100;
blue>180 and red<100;
red>100 and green>100 and blue<80;
red>180 and green>180 and blue>180;
green>(red+50) and red>100;
blue>(red+50) and red>100;
green<(red+15) and red<100;
blue>(red+15) and red<100;
|red-green|<30 and |red-blue|<30 and |green-blue|<30;
where each of red, green, and blue is from 0 to 255; and
having hue, saturation and luminance channel values outside of the following constraints:
80<hue<280;
saturation<0.28;
luminance<0.40;
where hue is from 0 to 360, saturation is from 0 to 1.0, and luminance is from 0 to 1.00.

28. An apparatus for locating a character set in a digital image comprising:
a color attribute detector for examining pixels of said digital image to detect pixels having specified color attributes;
a pixel color similarity detector identifying regions of pixels having said specified color attributes and clustering identified regions according to color similarity; and
a morphological constraint applier examining each cluster to detect the cluster meeting specified morphological constraints thereby to locate said character set;
wherein said color attribute detector examines the pixels to determine if the pixels meet at least one of specified red, green, blue (RGB) color properties and specified hue, saturation and luminance (HSL) properties;
wherein the color attribute detector examines the pixels to determine if the pixels meet both the specified RGB and HSL properties; and
wherein said color attribute detector processes the digital image in parallel to determine pixels meeting the specified RGB and HSL properties.

29. An apparatus according the claim 28 further comprising a filter to filter and blur the digital image prior to examining by said color attribute detector.

30. An apparatus for locating a character set in a digital image comprising:
a color attribute detector for examining pixels of said digital image to detect pixels having specified color attributes;
a pixel color similarity detector identifying regions of pixels having said specified color attributes and clustering identified regions according to color similarity; and
a morphological constraint applier examining each cluster to detect the cluster meeting specified morphological constraints thereby to locate said character set;
wherein said color attribute detector examines the pixels to determine if the pixels meet at least one of specified red, green, blue (RGB) color properties and specified hue, saturation and luminance (HSL) properties;
wherein the color attribute detector examines the pixels to determine if the pixels meet both the specified RGB and HSL properties;
wherein said pixel color similarity detector focuses on parts of the digital image with little blue information to identify the pixel regions; and wherein the pixel color similarity detector extracts red and blue channel images from the digital image and processes the red and blue channel images to yield a multi-level grey scale image with successive pixels of common grey scale forming said regions.

31. An apparatus according to claim 30 wherein said multi-level grey scale image includes four grey scale levels and wherein said pixel color similarity detector forms a difference image of said red and blue channel images and posterizes the difference image to yield the four level grey scale image.

32. An apparatus according to claim 31 wherein said pixel color similarity detector detects the average hue of the pixels in each region and clusters the regions according to average hue.

33. An apparatus according to claim 32 wherein the color pixel similarity detector clusters the regions into one of three hue levels to yield first, second and third hue channel images, the hue channel images being examined by the morphological constraint applier to locate said character set.

34. An apparatus according to claim 33 wherein said morphological constraint applier examines clusters to detect clusters having at least three horizontally aligned characters of similar height.

35. An apparatus according to claim 34 wherein said morphological constraint applier further examines the clusters to detect clusters bounded by a rectangle between 20 and 80 pixels.

36. An apparatus according to claim 35 wherein said morphological constraint applier further examines the clusters to detect a rectangle having a width between 20% and 90% of the digital image width.

37. An apparatus according to claim 36 wherein said morphological constraint applier deems the bounding rectangle encompassing the cluster having the greatest number of regions as that representing the character set when more than one cluster meets the morphological constraints.

* * * * *